United States Patent
Popa et al.

(10) Patent No.: US 9,794,185 B2
(45) Date of Patent: Oct. 17, 2017

(54) BANDWIDTH GUARANTEE AND WORK CONSERVATION

(75) Inventors: Lucian Popa, San Francisco, CA (US); Praveen Yalagandula, San Francisco, CA (US); Sujata Banerjee, Palo Alto, CA (US); Jeffrey C. Mogul, Menlo Park, CA (US); Yoshio Turner, San Francisco, CA (US); Jose Renato G. Santos, Morgan Hill, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 328 days.

(21) Appl. No.: 14/400,370

(22) PCT Filed: Jul. 31, 2012

(86) PCT No.: PCT/US2012/048962
§ 371 (c)(1),
(2), (4) Date: Nov. 11, 2014

(87) PCT Pub. No.: WO2014/021839
PCT Pub. Date: Feb. 6, 2014

(65) Prior Publication Data
US 2015/0134830 A1    May 14, 2015

(51) Int. Cl.
*G06F 15/16*     (2006.01)
*H04L 12/873*    (2013.01)
(Continued)

(52) U.S. Cl.
CPC ........ *H04L 47/528* (2013.01); *H04L 41/0896* (2013.01); *H04L 49/00* (2013.01)

(58) Field of Classification Search
CPC ........................................... G06F 2009/45595
(Continued)

(56) References Cited

U.S. PATENT DOCUMENTS

| | | | |
|---|---|---|---|
| 6,046,980 A * | 4/2000 | Packer | H04L 41/0213 370/229 |
| 8,218,538 B1 * | 7/2012 | Chidambaram | H04L 47/6205 370/386 |

(Continued)

FOREIGN PATENT DOCUMENTS

| | | |
|---|---|---|
| CN | 101228737 | 7/2008 |
| CN | 101369976 B | 2/2009 |
| CN | 102231697 | 11/2011 |

OTHER PUBLICATIONS

Ballani, Hitesh, et al., Towards Predictable Datacenter Networks, in Proc. of SIGCOMM'11, Toronto, ON, Canada, 2011.
(Continued)

*Primary Examiner* — Hamza Algibhah
(74) *Attorney, Agent, or Firm* — Mannava & Kang, P.C.

(57) ABSTRACT

According to an example, a method for bandwidth guarantee and work conservation includes determining virtual machine (VM) bandwidth guarantees assigned to VMs in a network including a source VM that communicates with destination VMs. The method further includes assigning minimum bandwidth guarantees to communications between the source VM with the destination VMs by dividing a VM bandwidth guarantee assigned to the source VM between the destination VMs based on active VM-to-VM communications between the source VM and the destination VMs. The method also includes allocating, by a processor, spare bandwidth capacity in the network to a communication between the source VM and a destination VM based on the assigned minimum bandwidth guarantees.

20 Claims, 7 Drawing Sheets

(51) Int. Cl.
*H04L 12/24* (2006.01)
*H04L 12/931* (2013.01)

(58) Field of Classification Search
USPC .......................................................... 709/226
See application file for complete search history.

(56) References Cited

U.S. PATENT DOCUMENTS

| | | | |
|---|---|---|---|
| 2010/0054129 A1 | 3/2010 | Kuik et al. | |
| 2011/0185064 A1 | 7/2011 | Head et al. | |
| 2011/0292792 A1 | 12/2011 | Zuo et al. | |
| 2011/0296052 A1* | 12/2011 | Guo ..................... | G06F 9/5077 709/240 |
| 2012/0127857 A1 | 5/2012 | Sundar et al. | |
| 2012/0324442 A1* | 12/2012 | Barde ..................... | H04L 49/70 718/1 |
| 2013/0290955 A1* | 10/2013 | Turner ..................... | H04L 41/12 718/1 |

OTHER PUBLICATIONS

Guo, Chuanxiong, et al., SecondNet: A Data Center Network Virtualization Architecture with Bandwidth Guarantees, 2010.
Jeyakumar, Vimalkumar, et al., EyeQ: Practical Network Performance Isolation for the Multi-tenant Cloud, Stanford University, Windows Azure, Jun. 12, 2012.
Lam, Terry, et al., NetShare: Virtualizing Bandwidth within the Cloud, Computer Science and Engineering, University of California, San Diego, MS 0114, La Jolla, CA 92040, Feb. 4, 2009.
Lam, Terry, et al., NetShare: Virtualizing Data Center Networks across Services, UCSD, May 19, 2010.
Popa, Lucian, et al., FairCloud: Sharing the Network in Cloud Computing, 2011.
Rodrigues, Henrique, et al., Gatekeeper: Supporting Bandwidth Guarantees for Multi-tenant Datacenter Networks, HP Labs, UFMG, ICSI, Jun. 6, 2011.
Shieh, Alan, et al., Sharing the Datacenter Network. In Proc. of USENIX NSDI, 2011.

* cited by examiner

BANDWIDTH GUARANTEE AND WORK CONSERVATION

BACKGROUND

In a cloud computing environment, a tenant can reserve one or more virtual machines (VMs), for example, to execute applications. For such applications executed on VMs, the tenant can use information, such as, central processing unit (CPU) usage, memory allocation, etc., to determine application performance. Tenants can also use information related to bandwidth guarantees to determine lower bounds on application performance. However, since cloud networks are shared by multiple tenants in a best efforts manner, cloud providers cannot accurately offer guarantees on the bandwidth that each VM can achieve. The lack of such bandwidth guarantee information prevents tenants from determining lower bounds on application performance. The lack of such bandwidth guarantee information also prevents transfer of enterprise applications to public clouds, since many enterprise applications need predictable performance guarantees.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

A cloud network can be shared by tenants that reserve one or more virtual machines (VMs), for example, to execute applications. A tenant may request a static bandwidth reservation for executing their applications. However, a static bandwidth reservation leads to inefficient utilization of the cloud network capacity. For example, the share of a tenant A cannot be used by another tenant B when tenant A is not fully utilizing its share.

According to an example, a bandwidth guarantee and work conservation apparatus and method are described. Because traffic in data centers can be bursty in nature, the bandwidth guarantee and work conservation apparatus and method provide for multiplexing of networking resources in a work-conserving manner, which provides significant improvement in the performance of tenants' applications. Multiplexing of networking resources in a work-conserving manner means that links in such networking resources are not fully utilized only when there is no unsatisfied traffic demand for the links. For example, an application may have a processing phase when the communication traffic is low, and a shuffle phase with a high level of communication traffic. For multiple simultaneously running instances of such an application, the bandwidth guarantee and work conservation apparatus and method provide improved efficiency for job completion, as opposed to each instance of the application being executed on one or more VMs that are assigned a static bandwidth reservation.

Generally, for an environment such as a cloud data center network, the bandwidth guarantee and work conservation apparatus and method provide minimum bandwidth guarantees, where each VM is guaranteed a minimum absolute bandwidth for sending and receiving traffic. The bandwidth guarantee and work conservation apparatus and method also provide for work conservation, in that if a link L is the source of congestion for a given flow, then the link L is fully utilized. The apparatus and method can be readily implemented and deployed, without modification of switches, and can be implemented in large-scale cloud data centers. For example, the apparatus and method can be implemented in end-host server processes, such as hypervisors hosting multiple virtual machines, in network interface cards of servers or in edge-switches. The apparatus and method may also be implemented between physical machines (e.g., for clouds where tenants receive physical machines).

The bandwidth guarantee and work conservation apparatus and method may be implemented, for example, inside hypervisors, without any support from switches. VM minimum bandwidth guarantees may be expressed by using a hose model. For the hose model, each VM X of a tenant is considered to be connected to a virtual switch through a dedicated link whose capacity is equal to the minimum bandwidth guarantee for VM X. The bandwidth guarantees can also be expressed using an extended hierarchical hose model. An extended hierarchical hose model may include groups that are formed by VMs and include hose models between the VMs in the groups, and further, hose models between the groups.

The bandwidth guarantee and work conservation apparatus and method may include a guarantee partitioning module to divide a minimum guaranteed VM bandwidth for a VM into VM-to-VM guarantees. The guarantee partitioning module may use, for example, rate-limiters in hypervisors that limit the traffic between pairs of VMs. To compute the rates enforced by these rate-limiters, the guarantee partitioning module may operate each hypervisor H to divide the bandwidth guarantee of each VM X hosted by the hypervisor H between the VMs with which VM X communicates. By dividing a bandwidth guarantee of a VM, the guarantee partitioning module ensures that each VM is provided with an absolute bandwidth guarantee according to the hose model, regardless of the traffic pattern of the other VMs in the network. The bandwidth guarantee and work conservation apparatus and method may further include a rate allocation module to provide work conservation by allocating spare capacity in a max-min manner based on the VM-to-VM guarantees. To achieve a work-conserving allocation, the rate-limiters may employ the rate allocation module to dynamically increase rates beyond the guarantees allocated by the guarantee partitioning module when there is no congestion.

The bandwidth guarantee and work conservation apparatus and method provide a distributed solution where hypervisors operate independently, without the use of complex coordination in addition to the normal flow of traffic. The bandwidth guarantee and work conservation apparatus and method facilitate independent operation of hypervisors without the need for complex coordination between the hypervisors or with a central controller. The bandwidth guarantee and work conservation apparatus and method may also be applied in a centralized manner, for example, by applying the decisions that are taken at each host machine at a central controller. The framework of the bandwidth guarantee and work conservation apparatus and method decouples providing of bandwidth guarantees from providing work-conservation. These features provide for work-conservation while ensuring that the guarantee for each VM is respected regardless of the other VMs in the network.

Figure 1:
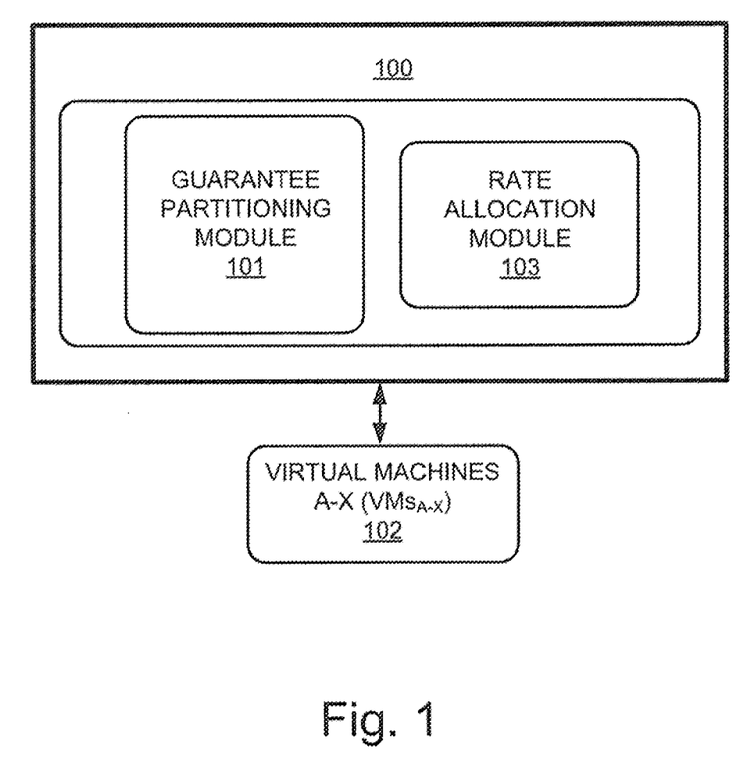
FIG. 1 illustrates an architecture of a bandwidth guarantee and work conservation apparatus, according to an example of the present disclosure.

FIG. 1 illustrates an architecture of a bandwidth guarantee and work conservation apparatus 100, according to an example. Referring to FIG. 1, the apparatus 100 is depicted as including a guarantee partitioning module 101 to assign minimum bandwidth guarantees to virtual machines (VMs) 102 (i.e., $VMs_{A-X}$) by dividing a minimum guaranteed VM bandwidth for a VM into VM-to-VM guarantees. A rate allocation module 103 is to provide work conservation by allocating spare capacity in a max-min manner based on the VM-to-VM guarantees.

The modules 101 and 103, and other components of the apparatus 100 that perform various other functions in the apparatus 100, may comprise machine readable instructions stored on a computer readable medium. In addition, or alternatively, the modules 101 and 103, and other components of the apparatus 100 may comprise hardware or a combination of machine readable instructions and hardware.

Figure 2:
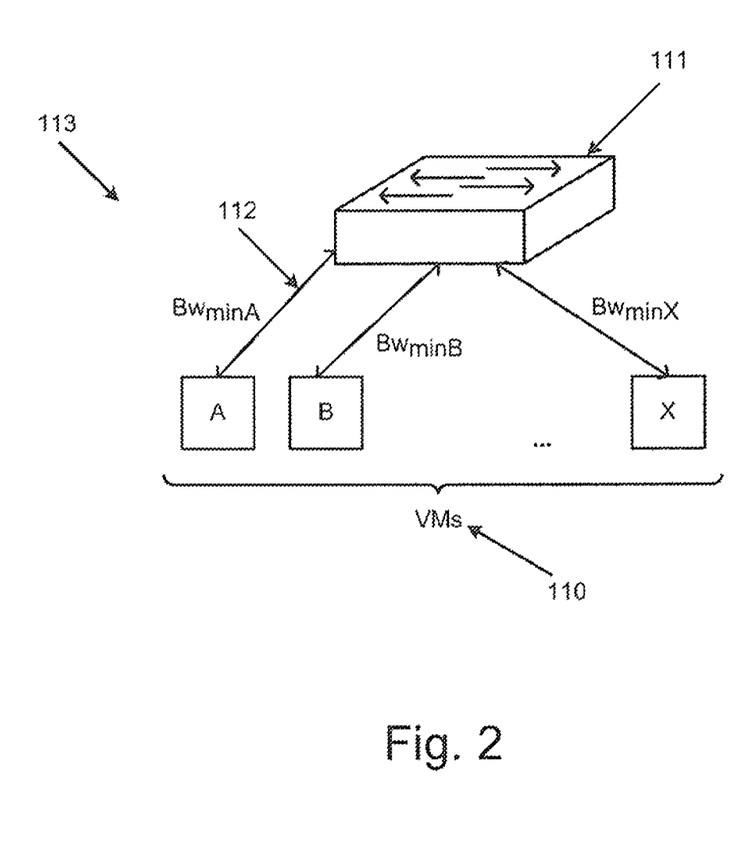
FIG. 2 illustrates a hose model for guaranteed virtual machine (VM) bandwidth for the bandwidth guarantee and work conservation apparatus, according to an example of the present disclosure.

Referring to FIGS. 1 and 2, the bandwidth guarantee and work conservation apparatus 100 may provide a hose model for each VM 110 (e.g., $VM_A$, $VM_B$ ... $VM_X$). The hose model guarantees a minimum bandwidth $Bw_{min}$ between a VM and a virtual central switch 111 with infinite capacity. For example, $VM_A$ may be guaranteed a minimum bandwidth $Bw_{minA}$ by a dedicated link 112 for $VM_A$ having the capacity $Bw_{minA}$. Similarly, $VM_B$ may be guaranteed a minimum bandwidth $Bw_{minB}$, up to $VM_X$ which is guaranteed a minimum bandwidth $Bw_{minX}$. The bandwidth to the central switch 111 may be higher than the minimum guaranteed bandwidth $Bw_{min}$, for example, depending on the demand of other VMs in a network 113. However, the bandwidth to the central switch 111 cannot be lower than the minimum guaranteed bandwidth $Bw_{min}$, given high enough demand in the network 113. The minimum guaranteed bandwidth $Bw_{min}$ may also be represented using other models, such as, an extended hierarchical hose model.

Figure 3:
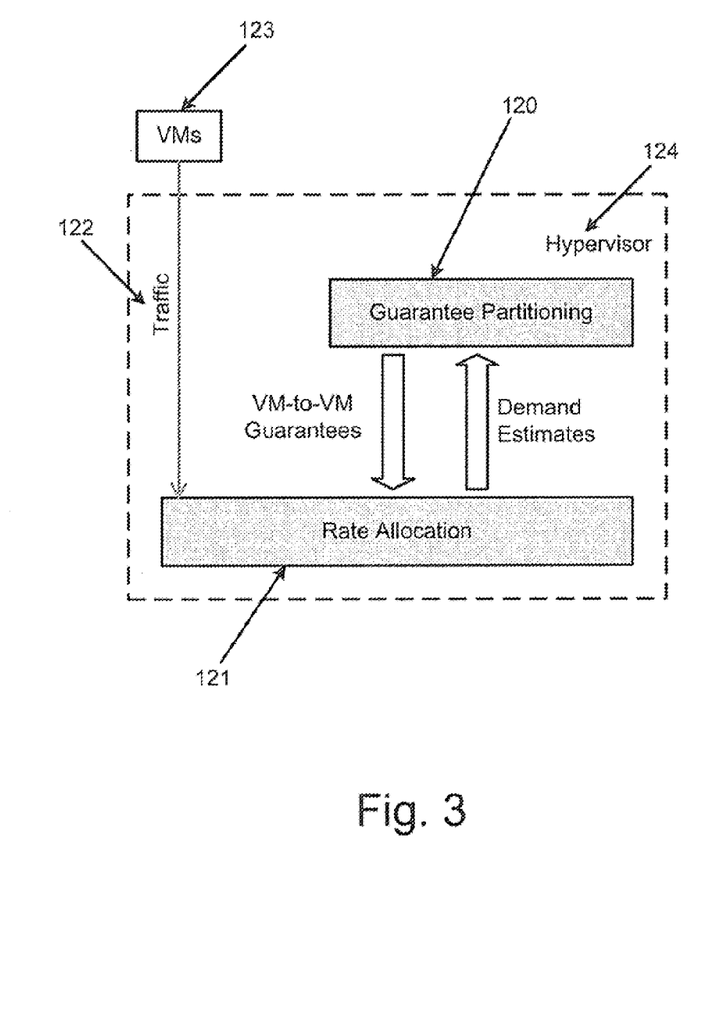
FIG. 3 illustrates a conceptual model for guarantee partitioning and rate-allocation for the bandwidth guarantee and work conservation apparatus, according to an example of the present disclosure.

Referring to FIGS. 1-3, the bandwidth guarantee and work conservation apparatus 100 can be modeled to include a guarantee partitioning layer 120 and a rate allocation layer 121. The guarantee partitioning layer 120, which is implemented by the guarantee partitioning module 101, provides bandwidth guarantees. The rate allocation layer 121, which is implemented by the rate allocation module 103, provides work conservation. The guarantee partitioning layer 120 and the rate allocation layer 121 decouple the aspects of bandwidth guarantees and work conservation. For traffic 122 flowing from VMs 123, the rate allocation layer 121 provides work conservation based on VM-to-VM guarantees and demand estimates, as discussed below. In the example illustrated, the apparatus 100 is implemented in a hypervisor 124 of a host machine. For example, the guarantee partitioning module 101 and the rate allocation module 103 perform periodic guarantee partitioning and rate allocation inside the hypervisor 124 for each hosted VM. In one example, guarantee partitioning may be performed less frequently than rate allocation, because the guarantees allocated for the VM-to-VM flows of a VM X are updated when demands change to and from the VM X. However, rates allocated for the same VM-to-VM flows of VM X may be updated when demands change on any congested link used by VM X.

Referring to FIG. 3, for the guarantee partitioning layer 120, the guarantee partitioning module 101 computes an absolute minimum bandwidth guarantee for each source and destination pair of the VMs 123. The guarantee computed between a source VM S and a destination VM D (i.e., $B^{S \to D}$) is based on the guarantees of the two VMs S and D in the hose model of FIG. 2 and on the current communication pattern of VMs S and D. The bandwidth guarantee of each VM is divided among the current set of active VM-to-VM flows for the given VM. In order to compute the guarantee $B^{S \to D}$ between VMs S and D, the guarantee partitioning module 101, which may be located in the hypervisor of source VM S, uses the guarantee allocated by the hypervisor of destination VM f to the VMs S→D traffic (i.e., $B_D^{S \to D}$). To send this information (i.e., the value of $B_D^{S \to D}$), the guarantee partitioning module 101 may use control packets between hypervisors. Initially each flow has the guarantee allocated by the source. Alternatively, guarantees may be carried in headers of the data packets, for example, using encapsulation at hypervisors.

The guarantee partitioning module 101 divides the bandwidth guarantee of a VM X between other VMs with which VM X communicates. For example, if VM X communicates with a set Q of VMs, for each VM Y in the set Q, the hypervisor for VM X assigns a bandwidth guarantee $B_X^{X \to Y}$ for the communication to VM Y, and $B_X^{Y \to X}$ for the communication from VM Y. Thus, the bandwidth guarantees in each direction to and from a VM may be different. The sum of the total amount of bandwidth guarantees allocated is equal to the bandwidth guarantee for VM X (i.e., $B_X$) in each direction as follows:

$$\Sigma_{Y \in Q} B_X^{X \to Y} = \Sigma_{Y \in Q} B_X^{Y \to X} = B_X \qquad \text{Equation (1)}$$

The guarantee partitioning module 101 sets the bandwidth guarantee of the communication between a source VM S and a destination VM D as follows:

$$B^{S \to D} = \min(B_S^{S \to D}; B_D^{S \to D}) \qquad \text{Equation (2)}$$

Figure 4:
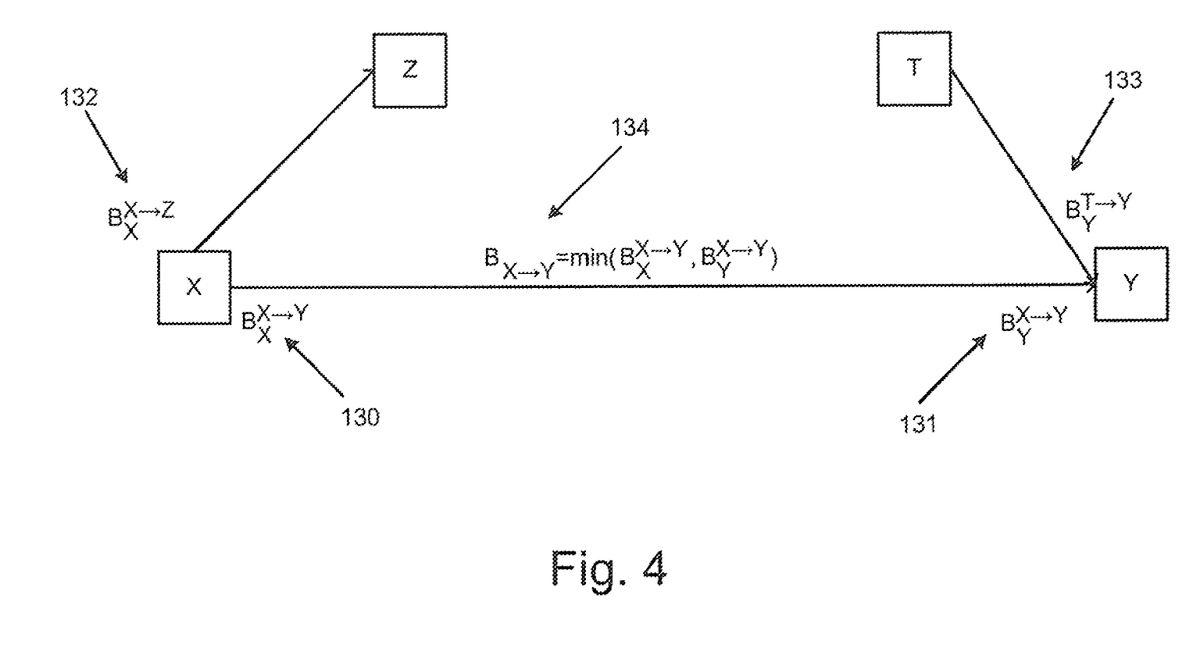
FIG. 4 illustrates guarantee partitioning for the bandwidth guarantee and work conservation apparatus, according to an example of the present disclosure.

For Equation (2), $B_S^{S \rightarrow D}$ and $B_D^{S \rightarrow D}$ are the guarantees assigned to the VM S→VM D communication for VM S and VM D, respectively. FIG. 4 illustrates the process of assigning guarantees to the VM X→VM Y communication by VM X and VM Y. For example, FIG. 4 shows VMs X, Y, Z and T. At 130, the hypervisor of VM X assigns a bandwidth guarantee $B_X^{X \rightarrow Y}$ for the communication to VM Y. At 131, the hypervisor of VM Y assigns a bandwidth guarantee $B_Y^{X \rightarrow Y}$ for the communication from VM X to Y. At 132, the hypervisor of VM X assigns a bandwidth guarantee $B_X^{X \rightarrow Z}$ for the communication from VM X to VM Z. At 133, the hypervisor of VM Y assigns a bandwidth guarantee $B_Y^{T \rightarrow Y}$ for the communication from VM T to VM Y. At 134, based on the bandwidth guarantees, the guarantee partitioning module 101 determines the appropriate bandwidth guarantee from VM X→VM V by determining $B^{X \rightarrow Y} = \min(B_X^{X \rightarrow Y}; B_Y^{X \rightarrow Y})$.

The allocation provides bandwidth guarantees, because on any link L, the total allocated bandwidth guarantees for VM-to-VM flows does not exceed the expected traffic on link L when VMs communicate according to the hose model shown in FIG. 2. In particular, the total incoming bandwidth guarantee of all the VM-to-VM flows of a VM X is less or equal to $B_X$, the bandwidth guarantee of VM X in the hose model, regardless of the communication pattern of VM X. This is because the bandwidth guarantee for VM X is divided between the flows for VM X, and each VM-to-VM flow receives the minimum bandwidth guarantee between the bandwidth guarantees allocated by a source and a destination. This can be represented as follows:

$$\Sigma_V B^{V \rightarrow X} = \Sigma_V \min(B_Y^{V \rightarrow X}, B_V^{V \rightarrow X}) \leq \Sigma_V B_Y^{V \rightarrow X} = B_X \quad \text{Equation (3)}$$

Figure 5:
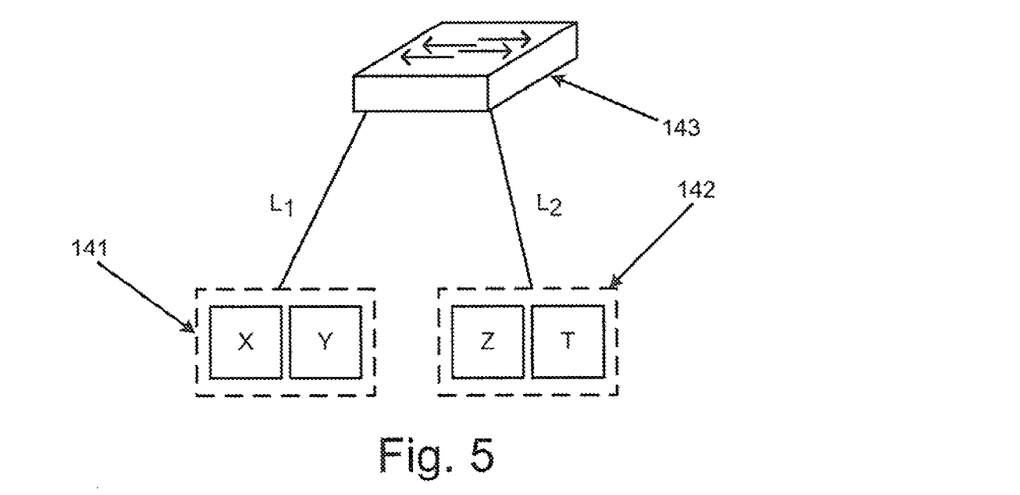
FIG. 5 illustrates implementation of the hose model of FIG. 2 in a physical topology for the bandwidth guarantee and work conservation apparatus, according to an example of the present disclosure.
Figure 6:
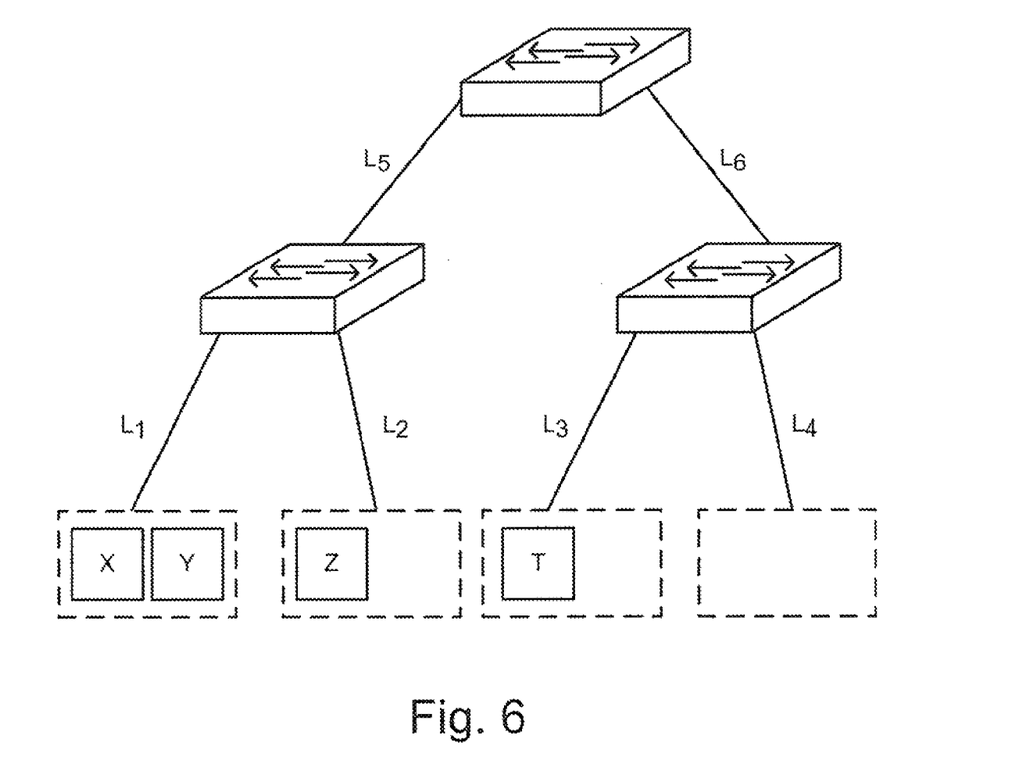
FIG. 6 illustrates another implementation of the hose model of FIG. 2 in a physical topology for the bandwidth guarantee and work conservation apparatus, according to an example of the present disclosure.

For example, in order to implement the hose model from FIG. 2 in the physical topology from FIG. 5, each VM should be provided a minimum guarantee for its incoming and outgoing bandwidth on its access link (e.g., either $L_1$ or $L_2$). In this case, the virtual switch 111 of FIG. 2 would be implemented by physical switch 143 of FIG. 5. Assuming each server hosts at most two VMs (i.e., servers 141 and 142), the VM-to-VM guarantees assigned by the hypervisor for VM Y compete on link $L_1$ at most with bandwidth guarantee $B_X$. If $B_X + B_Y$ is less than the capacity of $L_1$ and $B_Z + B_T$ is less than the capacity of $L_2$, the deployment of the hose model from FIG. 2 is guaranteed in the topology shown in FIG. 5. Referring to FIG. 6, in another example, on links $L_3$, $L_5$ and $L_6$, the bandwidth guarantee of the VM-to-VM flows of a tenant with VMs X, Y, Z, and T will be less or equal to bandwidth guarantee $B_T$ (in this example, it is assumed that $B_T < B_X + B_Y + B_Z$). Thus, a provider can use the hose model provided by a tenant to perform admission control, and the bandwidth guarantee and work conservation method and apparatus ensure that the hose model is followed.

In order for the guarantee partitioning module 101 to divide the guarantee for VM X between the VM-to-VM flows for VM X, if the bandwidth guarantee between VMs X and Y is greater than the traffic demand between VMs X and Y, then the entire traffic is guaranteed to travel safely from VMs X to Y. Therefore, if the total incoming or outgoing demand of VM X is smaller than the guarantee for VM X, the guarantee portioning module 101 distributes the guarantee for VM X to satisfy all the demands, which can be represented as follows:

$$\forall Y, B_X^{S \rightarrow Y} \geq D^{X \rightarrow Y} \text{ and } B_X^{Y \rightarrow X} \geq D^{Y \rightarrow X} \quad \text{Equation (4)}$$

For Equation (4), $D^{X \rightarrow Y}$ represents the traffic demand from VM X to VM Y. However, if the total demand to or from VM X is larger than the bandwidth guarantee for VM X, the demand cannot be satisfied. In this case, $B_X$ is divided between different VMs in a max-min manner based on demands. For example, assume VM X has a bandwidth guarantee of 100 Mbps. Further, assume that VM X communicates with three other VMs Y Z and T, and the demand from VM X to VM Y is 20 Mbps, while demands from VM X to VMs Z and T are very large. In this case, the guarantee partitioning module 101 assigns a guarantee of 20 Mbps to the VM X→VM Y communication (i.e., $B_X^{X \rightarrow Y} = 20$ Mbps), and a guarantee of 40 Mbps to each of VM X→VM Z and VM X→VM T communications. Further, as described in further detail below with respect to the rate allocation module 103, based on the application of a work-conserving policy, the bandwidth for VM X can be larger than 100 Mbps, as VMs X→Z and VM X→T compete for extra bandwidth with other VMs that can exceed their guarantees.

Therefore, the rate allocation module 103 monitors demands, and the guarantee partitioning module 101 assigns the desired bandwidth guarantees to bounded VM-to-VM flows, with the remaining guarantee being divided fairly between the rest of the flows by the rate allocation module 103, To estimate demands, the rate allocation module 103 may monitor incoming and outgoing queue arrival rates. The guarantee for a bounded VM-to-VM flow may be set at a slightly higher value than its demand, to allow the demand to increase and avoid misclassification, for example, due to inefficiencies of transport protocols. If all flows are bounded, the unallocated part of the bandwidth guarantee of one VM is redistributed by the rate allocation module 103, such that the entire VM bandwidth guarantee is allocated.

Since the guarantee partitioning module 101 provides for usage of the minimum bandwidth guarantees for the sending and receiving VMs, guarantees may be wasted for one of the endpoints, in particular, for sending VMs. The sending VMs can take into account the assigned guarantee for the receiving VMs when the demands of the sending VMs are not satisfied. For example, if a destination VM D allocates a smaller guarantee compared to the guarantee for sender VM S (i.e., $B_S^{S \rightarrow D} > B_D^{S \rightarrow D}$) and if destination VM D marks a given flow of traffic as unbounded (i.e., VM V allocated for VM S→VM D its maximum fair share), the sender VM S matches the guarantee of the destination VM D (i.e., sets $B_S^{S \rightarrow D} = B_D^{S \rightarrow D}$).

VMs collocated with a given VM X on the same server are omitted when dividing the bandwidth guarantee for VM X. By rate-limiting the traffic between each pair of VMs S and D to $B^{S \rightarrow D}$, the minimum bandwidth guarantee of each VM in the hose model is satisfied. Guarantees are computed based on maximum server occupancy and worst case network utilization. However, many of the VMs may not be active, in which case rate-limits can be increased without negatively impacting guarantees.

Referring to FIGS. 1 and 3, the minimum bandwidth computed by the guarantee partitioning module 101 between two VMs X and Y (i.e., $B^{X \rightarrow Y}$) is fed into the rate allocation layer 121 (i.e., the rate allocation module 103). For the rate allocation layer 121, the rate allocation module 103 controls, for example, a rate-limiter inside the hypervisor for the VM X that limits the traffic from VM X to VM Y. The rate-limit assigned by the rate allocation module 103 does not drop below the minimum bandwidth $B^{X \rightarrow Y}$, but can be higher than $B^{X \rightarrow Y}$. The rate allocation module 103 determines any available bandwidth in addition to the provided guarantee, when the network is not congested. The rate allocation module 103 shares the additional bandwidth available on a link L in proportion to the bandwidth guarantees of the source and destination VM pairs communicating on the link L. For example, assuming the minimum bandwidth $B^{X \to Y}=200$ Mbps and $B^{Z \to T}=100$ Mbps for VMs X, Y, Z and T, in this case, sharing a link L larger than 300 Mbps between VMs X→Y and VMs Z→T is done in a 2:1 ratio. For example, if link L is 1 Gbps, VMs X→Y receive 666 Mbps and VMs Z→T receive 333 Mbps.

The rate allocation module 103 controls the rate between each VM X to each other VM Y such that the entire (or a predetermined fraction of) available network capacity is utilized, and congested links are shared between VM-to-VM flows in proportion to the bandwidth guarantees provided by the guarantee partitioning module 101. The rate allocation module 103 may therefore use weighted rate adaptation implemented by the rate-limiter inside the hypervisor for a VM, where the weight (i.e., bandwidth guarantee) of the flow between VM X and Y is $B^{X \to Y}$ (i.e., the minimum bandwidth guarantee provided by the guarantee partitioning module 101). The rate allocation module 103 sets the rate-limit from a source VM S to a destination VM D to $R^{S \to D}$ as follows:

$$R^{S \to D} = \max(B^{S \to D}; R_{W\_TCP}(B^{S \to D}; F^{S \to D})) \quad \text{Equation (5)}$$

For Equation (5), $R_{W\_TCP}$ is the rate given by a protocol similar to a weighted transmission control protocol (TCP) protocol, operating with weight $B^{S \to D}$ and given congestion feedback $F^{S \to D}$. The rate allocation module 103 uses the weighted rate-adaptation $R_{W\_TCP}$ process to compute a shadow rate limit. When the computed shadow rate is higher than the minimum bandwidth guarantee, the computed shadow rate is used instead of the minimum bandwidth guarantee, since this situation indicates there is free bandwidth in the network. The rate allocation module 103 may increase the rate-limit of traffic from VM X to VM Y on positive feedback (i.e., lack of congestion) proportional to the weight, and use a cubic function. On negative feedback (i.e., lost packets), the rate allocation module 103 may decrease the rate-limit multiplicatively by a constant ratio independent of the weight. The rate allocation module 103 thus guarantees that each VM achieves its minimum hose-model bandwidth if the traffic flow between VMs is long enough to allow rate-allocation to reduce the rates of opportunistic transmitters (i.e., allow negative feedback to be transmitted).

With regard to congestion feedback, congestion feedback can take multiple forms. In one example, the congestion feedback can be represented by a number of lost packets counted by a destination hypervisor and returned to a host hypervisor in special control packets. In another example, the congestion feedback can be represented by explicit congestion notification (ECN) markings performed by switches. Switch support, such as ECN, corroborated with non aggressive rate allocation procedures, can reduce latency by keeping buffer utilization low.

With regard to traffic to and from the Internet, if a cloud is attached to the Internet through the root of a tree, and if gateways at the ingress of a data center implement the bandwidth guarantee and work conservation apparatus 100, the apparatus 100 may be used to provide guarantees for the traffic to and from the Internet. For example, the bandwidth guarantee between a VM X and the Internet is directly associated with a guarantee assigned to VM X. In this regard, hosts from the Internet may be treated as a single VM but with potentially a higher weight (e.g., equivalent to 100 internal VMs).

Instead of the hose model, if a model similar to a virtual oversubscribed cluster (VOC) model is used, groups of a tenant's VMs are assigned high-bandwidth guarantees within the groups, and lower guarantees are provided between the groups. For example, in a two-tiered abstraction that can be offered with the bandwidth guarantee and work conservation apparatus 100, VMs for a tenant can be grouped. Each VM X has two guarantees associated: $B_{XinG}$ for a hose connecting VM X to other VMs in the same group G, and $B_{Xall}$ for a hose connecting VM X with all VMs in all groups (i.e., $B_X$ from the single level hose model of FIG. 2). When starting a new VM, a tenant can select the values of the bandwidths and to which group the new VMs should belong to. To support an abstraction similar to the VOC model, when VM X in a group G communicates with another VM Y, the hypervisor hosting VM X needs to know whether VM Y is in the group G or not, to divide the bandwidth guarantee for VM X accordingly. The information about the group membership of VM Y can be transmitted through control packets used to carry the assigned pairwise bandwidth guarantee between VMs X and Y (i.e. $B_X^{X \to Y}$ and $B_X^{X \to Y}$). If VM Y is in the group G, the guarantee $B^{X \to Y}$ is allocated by dividing $B_{XinG}+B_{Xall}$ instead of $B_X$, since X can communicate with VMS in the group G using both $B_{XinG}$ and $B_{Xall}$. If VM Y belongs to a different group, guarantee $B^{X \to Y}$ is computed as the minimum between the allocation of VM X→VM Y when competing for guarantee $B_{XinG}+B_{Xall}$ with all other VMs from the group G that communicate with VM X and for $B_{Xall}$ with other VMs outside G communicating with VM X. This approach allows for variable sized groups and heterogeneous VM guarantees inside each group.

The bandwidth guarantee and work conservation apparatus and method can be used on any single-path routing topology, as long as an admission control criterion of not oversubscribing any link with guarantees is maintained. Specifically, if a link L is used by a subset Q of the hose model VMs to send data to another subset P, the reserved bandwidth on link L is set to be $\min(G_Q, G_P)$, where $G_Q$ is the sum of the guarantees of the VMs in subset Q, and $G_P$ is the sum of the guarantees of the VMs in subset P. The bandwidth guarantee and work conservation apparatus and method can also be applied to multi-path topologies, where load balancing is uniform across paths, such as fat-tree topologies or other multi-rooted tree topologies. In this case, L represents the set of links on which traffic is load balanced. For example, for fat-trees, L represents the set of parallel links at a given level that can be used by one VM towards the root nodes. For multi-path topologies with non-uniform load balancing across paths, such as a random regular graph topology, the bandwidth guarantee and work conservation apparatus and method can use three control layers instead of two (i.e., guarantee partitioning, path partitioning and rate allocation). Path partitioning is connected to the load balancing and routing in the datacenter, and divides the guarantee assigned by the guarantee partitioning layer between two VMs among multiple paths. The decision of path partitioning is based on the capacity, load and length of each path. The other layers (i.e., guarantee partitioning and rate allocation) operate unmodified as shown in FIG. 3.

Figure 7:
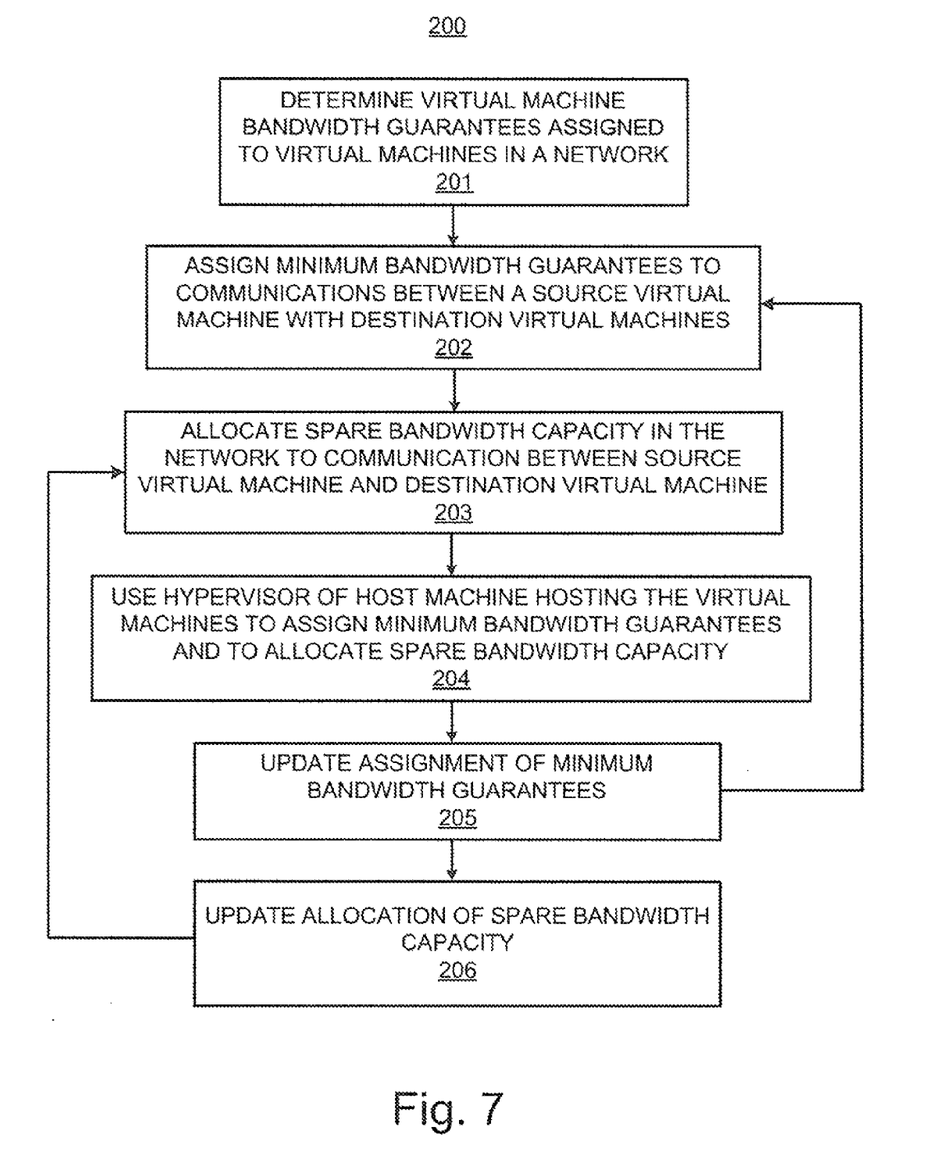
FIG. 7 illustrates a method for bandwidth guarantee and work conservation, according to an example of the present disclosure.

FIG. 7 illustrates a flowchart of a method 200 for bandwidth guarantee and work conservation, corresponding to the example of the bandwidth guarantee and work conservation apparatus 100 whose construction is described in detail above. The method 200 may be implemented on the bandwidth guarantee and work conservation apparatus 100 with reference to FIG. 1 by way of example and not limitation. The method 200 may be practiced in other apparatus.

Referring to FIG. 7, for the method 200, at block 201, VM bandwidth guarantees assigned to VMs in a network including a source VM that communicates with destination VMs are determined. For example, referring to FIG. 1, in order to assign minimum bandwidth guarantees to the VMs 102, the guarantee partitioning module 101 determines VM bandwidth guarantees assigned to VMs in a network including a source VM that communicates with destination. VMs.

At block 202, minimum bandwidth guarantees are assigned to communications between the source VM with the destination VMs by dividing a VM bandwidth guarantee assigned to the source VM between the destination VMs based on active VM-to-VM communications between the source VM and the destination VMs. For example, referring to FIG. 1, the guarantee partitioning module 101 assigns minimum bandwidth guarantees to the VMs 102 (i.e., VMs$_{A-X}$) by dividing a minimum guaranteed VM bandwidth for a VM into VM-to-VM guarantees. For example, if a VM X communicates with a set Q of VMs, for each VM Y in the set Q, the hypervisor for VM X assigns a bandwidth guarantee $B_X^{X \to Y}$ for the communication to VM Y, and $B_X^{Y \to X}$ for the communication from VM Y. The sum of the minimum bandwidth guarantees between pairs of VMs assigned by the hypervisor of VM X is equal to the VM bandwidth of VM X in the hose model for both the traffic incoming to VM X as well as for the traffic outgoing from VM X (i.e., Equation (1)). Assigning minimum bandwidth guarantees to communications between the source VM with the destination VMs further includes determining a first minimum bandwidth guarantee value for a communication from the source VM to an endpoint VM, wherein the endpoint VM is one of the destination VMs, determining a second minimum bandwidth guarantee value for a communication from the endpoint VM to the source VM, selecting a minimum value from the first and second minimum bandwidth guarantee values, and using the minimum value as the minimum bandwidth guarantee for the communication from the source VM to the endpoint VM (i.e., Equation (2)). The described method can also support a heterogeneous hose model, where the incoming bandwidth guarantee of a VM X can be different than the outgoing bandwidth guarantee. For example, VM X may process a substantial amount of data, but the result of the processing can be a comparably small amount of data. In this case, the incoming bandwidth guarantee $B_{Xincoming}$ can be large, e.g., 500 Mbps, while the outgoing guarantee, $B_{Xoutgoing}$ can be small, e.g., 100 Mbps. In this case, the sum of the VM-to-VM guarantees assigned by the hypervisor of VM X for the traffic from VM X matches the outgoing guarantee for VM X, while the sum of the incoming VM-to-VM guarantees assigned by the hypervisor of VM X for the traffic to VM X matches the incoming guarantee for VM X. Specifically, if VM X communicates with a set Q of VMs, this can be represented as $\Sigma_{Y \in Q} B_X^{X \to Y} = B_{Xoutgoing}$ and $\Sigma_{Y \in Q} B_X^{Y \to X} = B_{Xincoming}$.

At block 203, spare bandwidth capacity in the network is allocated to a communication between the source VM and a destination VM based on the assigned minimum bandwidth guarantees. The spare bandwidth capacity in the network is also allocated to the communication between the source VM and the destination VM further based on demand estimates of the active VM-to-VM communications between the source VM and the destination VMs. For example, referring to FIG. 1, the rate allocation module 103 provides work conservation by allocating spare capacity in a max-min manner based on the VM-to-VM guarantees. The spare bandwidth capacity in the network is assigned to the active VM-to-VM communications between the source VM and the destination VMs such that an entire (or predetermined) available network capacity is utilized. Further, the spare bandwidth capacity in the network is assigned to the active VM-to-VM communications between the source VM and the destination VMs such that fully utilized (i.e., congested) links are shared in proportion to the assigned minimum bandwidth guarantees.

At block 204, a hypervisor of a host machine hosting the VMs is used to assign the minimum bandwidth guarantees between pairs of VMs and to allocate the spare bandwidth capacity. For example, referring to FIGS. 1 and 3, the apparatus 100 may be implemented in the hypervisor 124 of a host machine.

At block 205, the assignment of minimum bandwidth guarantees can be updated periodically, or, for example, by detecting when demand between active VM-to-VM communications changes. For example, guarantees allocated for VM-to-VM flows of a VM X are updated when demands change to and from the VM X or when VM X begins communication with a VM with which VM X did not previously communicate for an extended period of time.

At block 206, the allocation of spare bandwidth capacity can be updated periodically, or, for example, by detecting when the demand on a fully utilized link used by the source VM for communication with a destination VM changes. For example, rates allocated for the same VM-to-VM flows of VM X may be updated when demands change on any congested link used by VM X.

Figure 8:
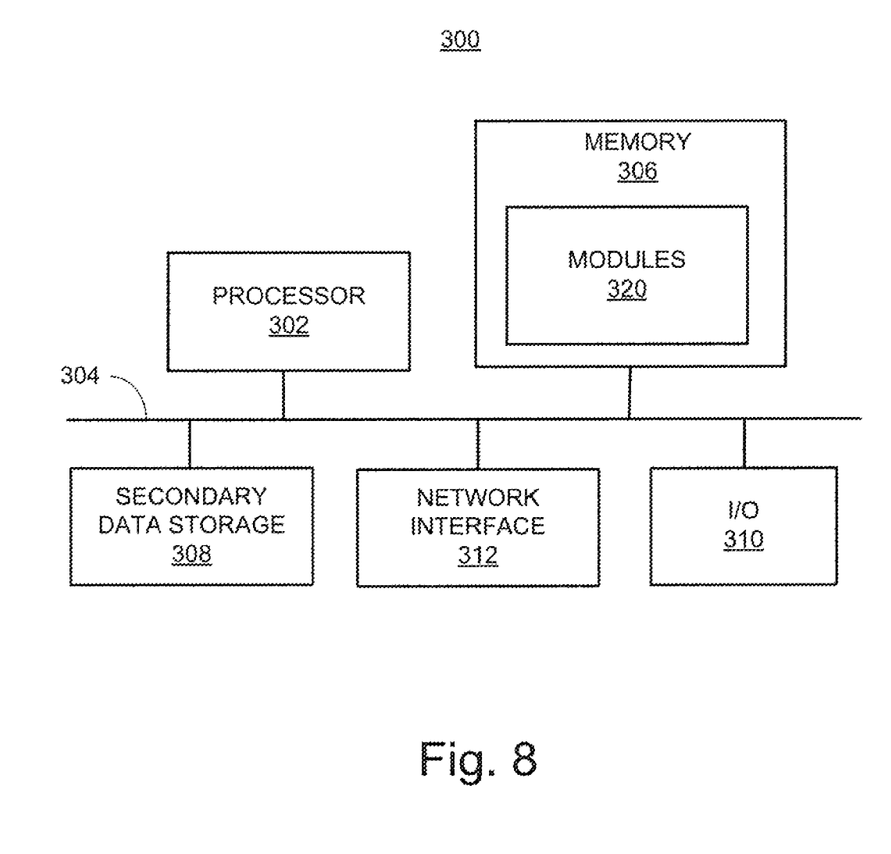
FIG. 8 illustrates a computer system, according to an example of the present disclosure.

FIG. 8 shows a computer system that may be used with the examples described herein. The computer system represents a generic platform that includes components that may be in a server or another computer system. The computer system may be used as a platform for the apparatus 100. The computer system may execute, by a processor or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system includes a processor 302 that may implement or execute machine readable instructions performing some or all of the methods, functions and other processes described herein. Commands and data from the processor 302 are communicated over a communication bus 304. The computer system also includes a main memory 306, such as a random access memory (RAM), where the machine readable instructions and data for the processor 302 may reside during runtime, and a secondary data storage 308, which may be non-volatile and stores machine readable instructions and data. The memory and data storage are examples of computer readable mediums. The memory 308 may include modules 320 including machine readable instructions residing in the memory 306 during runtime and executed by the processor 302. The modules 320 may include the modules 101 and 103 of the apparatus shown in FIG. 1.

The computer system may include an I/O device 310, such as a keyboard, a mouse, a display, etc. The computer system may include a network interface 312 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A method for bandwidth guarantee and work conservation, the method comprising:
    determining virtual machine (VM) bandwidth guarantees assigned to VMs in a network including a source VM that communicates with destination VMs; and
    assigning minimum bandwidth guarantees to communications between the source VM with the destination VMs by dividing a VM bandwidth guarantee assigned to the source VM between the destination VMs based on active VM-to-VM communications between the source VM and the destination VMs;
    wherein assigning minimum bandwidth guarantees includes:
        determining a first minimum bandwidth guarantee value for a communication from the source VM to an endpoint VM that is one of the destination VMs;
        determining a second minimum bandwidth guarantee value for a communication from the endpoint VM to the source VM; and
        selecting a minimum bandwidth guarantee for the communication from the source VM to the endpoint VM, based on the first minimum bandwidth guarantee value and the second minimum bandwidth guarantee value.

2. The method of claim 1, including:
    allocating, by a processor, spare bandwidth capacity in the network to a communication between the source VM and a destination VM, based on the minimum bandwidth guarantees.

3. The method of claim 2, including:
    allocating the spare bandwidth capacity in the network to the communication between the source VM and the destination VM further based on a demand estimate of the active VM-to-VM communications between the source VM and the destination VMs.

4. The method of claim 1, wherein a sum of the minimum bandwidth guarantees for communications from the destination VMs to the source VM is equal to the VM bandwidth guarantee assigned to the source VM.

5. The method of claim 1, wherein a sum of the minimum bandwidth guarantees for communications from the source VM to the destination VMs is equal to the VM bandwidth guarantee assigned to the source VM.

6. The method of claim 1, including:
    using a hypervisor of a host machine hosting a VM of the network to assign the minimum bandwidth guarantees and to allocate the spare bandwidth capacity.

7. The method of claim 1, including:
    updating the assignment of minimum bandwidth guarantees when a demand estimate of the active VM-to-VM communications changes.

8. The method of claim 2, including:
    updating the allocation of spare bandwidth capacity when a demand estimate of a fully utilized link used by the source VM for communication with a destination VM changes.

9. The method of claim 2, wherein allocating spare bandwidth capacity in the network includes:
    assigning the spare bandwidth capacity in the network to the active VM-to-VM communications between the source VM and the destination VMs such that an entire available network capacity is utilized.

10. The method of claim 2, wherein allocating spare bandwidth capacity in the network includes:
    assigning the spare bandwidth capacity in the network to the active VM-to-VM communications between the source VM and the destination VMs such that fully utilized links are shared in proportion to the minimum bandwidth guarantees.

11. The method of claim 1, including:
    when the network allows for multiple paths of communication between two VMs, determining a path partitioning for communication between the two VMs based on one of a capacity, a load, and a length for each path of the multiple paths, wherein the partitioning is performed independently of the assigning of minimum bandwidth guarantees.

12. The method of claim 1, including:
    when the network allows for VMs to group by VM group identities, determining a group minimum bandwidth guarantee for a pairwise grouping of VM group identities, wherein the group minimum bandwidth guarantee for the pairwise grouping is independent of other minimum bandwidth guarantees.

13. The method of claim 1, wherein when the network connects to the Internet, the minimum bandwidth guarantees include a minimum bandwidth guarantee for Internet traffic.

14. The method of claim 1, wherein the source VM matches the first minimum bandwidth guarantee of the source VM to the second minimum bandwidth guarantee of the endpoint VM after a communication from the endpoint VM to the source VM does not satisfy a demand of the source VM and the endpoint VM has marked the communication as unbounded.

15. The method of claim 1, including:
    determining a demand estimate of the network by monitoring incoming and outgoing queue arrival rates of the active VM-to-VM communications of the source VM.

16. A bandwidth guarantee and work conservation apparatus comprising:
    a memory storing a module comprising machine readable instructions to:
        determine virtual machine (VM) bandwidth guarantees assigned to VMs in a network including a source VM that communicates with destination VMs; and
        assign minimum bandwidth guarantees to communications between the source VM with the destination VMs based on VM-to-VM communications between the source VM and the destination VMs; and
    a processor to implement the module;
    wherein the instructions to assign minimum bandwidth guarantees include instructions to:
        determine a first minimum bandwidth guarantee value for a communication from the source VM to an endpoint VM that is one of the destination VMs;
        determine a second minimum bandwidth guarantee value for a communication from the endpoint VM to the source VM; and
        select a minimum bandwidth guarantee for the communication from the source VM to the endpoint VM, based on the first minimum bandwidth guarantee value and the second minimum bandwidth guarantee value.

17. The apparatus of claim 16, further comprising machine readable instructions to:

select a minimum value from one of the first minimum bandwidth guarantee value and the second minimum bandwidth guarantee value to use as the minimum bandwidth guarantee for the communication from the source VM to the endpoint VM.

18. The apparatus of claim 16, further comprising machine readable instructions to:
allocate spare bandwidth capacity in the network to a communication between the source VM and a destination VM, based on the minimum bandwidth guarantees and further based on a demand estimate of the VM-to-VM communications between the source VM and the destination VMs.

19. The apparatus of claim 16, further comprising machine readable instructions to:
assign the spare bandwidth capacity in the network to the VM-to-VM communications between the source VM and the destination VMs such that an entire available network capacity is utilized and such that fully utilized links are shared in proportion to the minimum bandwidth guarantees.

20. A non-transitory computer readable medium having stored thereon machine readable instructions for bandwidth guarantee and work conservation, the machine readable instructions when executed to cause a computer system to:
determine virtual machine (VM) bandwidth guarantees assigned to VMs in a network including a source VM that communicates with destination VMs;
assign minimum bandwidth guarantees to communications between the source VM with the destination VMs;
wherein the machine readable instructions to assign minimum bandwidth guarantees include machine readable instructions that when executed cause a computer system to:
determine a first minimum bandwidth guarantee value for a communication from the source VM to an endpoint VM that is one of the destination VMs;
determine a second minimum bandwidth guarantee value for a communication from the endpoint VM to the source VM; and
select a minimum bandwidth guarantee for the communication from the source VM to the endpoint VM, based on the first minimum bandwidth guarantee value and the second minimum bandwidth guarantee value.

* * * * *